United States Patent [19]

Evers et al.

[11] Patent Number: 4,839,438

[45] Date of Patent: Jun. 13, 1989

[54] CRYSTALLINE UNSATURATED POLYESTER AND THE PREPARATION THEREOF

[75] Inventors: Johannes T. Evers, Maarn; Robertus G. Berenbak, Hoek van Hollan, both of Netherlands

[73] Assignee: DSM Resins B.V., Zwolle, Netherlands

[21] Appl. No.: 77,244

[22] Filed: Jul. 24, 1987

Related U.S. Application Data

[63] Continuation of Ser. No. 811,441, Dec. 20, 1985, abandoned.

[30] Foreign Application Priority Data

Dec. 21, 1984 [NL] Netherlands .......................... 8403883

[51] Int. Cl.$^4$ ....................... C08L 75/06; C08G 18/28
[52] U.S. Cl. ...................... 525/440; 528/66; 428/423.1; 428/423.7
[58] Field of Search ...................... 525/28, 44; 528/66; 428/423.1, 423.7

[56] References Cited

U.S. PATENT DOCUMENTS

| | | | |
|---|---|---|---|
| 3,043,807 | 7/1962 | Snyder | 525/28 |
| 3,677,920 | 7/1972 | Kai | 525/28 |
| 3,703,498 | 11/1972 | Harris | 525/440 |
| 3,824,201 | 7/1974 | McGranaghan | 525/28 |
| 3,862,021 | 1/1975 | Hagihara | 525/28 |
| 3,933,728 | 1/1976 | Henbest | 523/512 |
| 4,086,203 | 4/1978 | Shaw et al. | 428/375 |
| 4,189,517 | 2/1980 | Shanoski | 528/75 |
| 4,228,113 | 10/1980 | Van Gasse | 264/24 |
| 4,289,684 | 9/1981 | Kallaur | 525/28 |
| 4,302,551 | 11/1981 | Horn | 521/163 |
| 4,349,601 | 9/1982 | Brueggann | 428/323 |
| 4,499,235 | 2/1985 | Verwer | 525/38 |
| 4,560,708 | 12/1985 | Horn | 521/137 |

FOREIGN PATENT DOCUMENTS

| | | |
|---|---|---|
| 0032380 | 7/1981 | European Pat. Off. . |
| 0106399 | 4/1984 | European Pat. Off. . |
| 0143396 | 6/1985 | European Pat. Off. . |
| 2337706 | 2/1974 | Fed. Rep. of Germany . |

OTHER PUBLICATIONS

Brian Parkyn, Commercial Polyester Resins, pp. 29–43, *Polyesters*, vol. 2, 1967.

Primary Examiner—Patricia Short
Attorney, Agent, or Firm—Cushman, Darby & Cushman

[57] ABSTRACT

The invention relates to crystalline unsaturated polyester, consisting of segments derived from a mainly hydroxy-terminated, unsaturated polyester, bound through urethane bonds to units derived from a (poly)isocyanate and further, if desired, in an amount that is at most relatively small, units, bound via urethane bonds, that are derived from a diol containing between 2 and 12 carbon atoms and/or from a diamine containing between 2 and 12 carbon atoms and/or from an alkanolamine containing between 2 and 12 carbon atoms.

14 Claims, No Drawings

CRYSTALLINE UNSATURATED POLYESTER AND THE PREPARATION THEREOF

This application is a continuation of application Ser. No. 811,441, filed Dec. 20, 1985, now abandoned.

FIELD OF THE INVENTION

The invention relates to crystalline unsaturated polyesters and the preparation thereof.

BACKGROUND OF THE INVENTION

Crystalline unsaturated polyesters are known. They are used, for instance, in glues, as modifier in combination with amorphous unsaturated polyesters, and in moulding powders. The known unsaturated crystalline polyesters suffers the drawback that cured polyesters based on such compounds are relatively brittle, or have a low impact strength.

SUMMARY AND OBJECTS OF THE INVENTION

The present invention relates to crystalline unsaturated polyesters consisting of polyester segments derived from a mainly hydroxy-terminated, unsaturated polyester, bound through urethane bonds to units derived from a (poly)isocyante and further, if desired, in an amount that is at most relatively small, to units, bound by urethane bonds, that are derived from a diol containing between 2 and 12 carbon atoms and/or from a diamine containing between 2 and 12 carbon atoms and/or from an alkanolamine containing between 2 and 12 carbon atoms.

The object of the invention is to obtain new unsaturated crystalline polyesters, particularly such as can be cured to yield objects with an advantageous combination of rigidity and impact strength.

DETAILED DESCRIPTION OF THE INVENTION

According to the invention, new crystalline unsaturated polyesters essentially consist of segments derived from mainly hydroxy-terminated, preferably crystalline, unsaturated polyesters, bound via urethane bonds to units derived from (poly)isocyanates, and further, if desired, in an amount that is at most relatively small, units, bound via urethane bonds or the like, that are derived from a diol containing between 2 and 12 carbon atoms and/or from a diamine containing between 2 and 12 carbon atoms and/or from an alkanolamine containing between 2 and 12 carbon atoms.

Such new crystalline unsaturated polyesters can now be obtained in high molecular weight by facile processes, and such polyesters, unexpectedly, retain crystallinity. The crystalline polyesters that are obtained do show a favorable combination of rigidity and impact strength in a cured object.

The resins according to the invention can be cured either by themselves or together with one or more monomeric, oligomeric or polymeric unsaturated compounds through a radical reaction or under the influence of high-energy radiation. They can be applied, inter alia, as binding agent in powder paint or powdered in-mould coating systems, as binding agent for sand, glass fibres or other fillers for making shaped objects, as moulding compound or as injection moulding compound.

The advantage of the crystalline polyesters is the possibility of processing them to free-flowing powders. Thanks to the link via the polyisocyanate, it is relatively easy to achieve better properties. By varying the choice of raw materials, end products with varying properties, from highly flexible to very rigid, can be obtained.

Comparison of objects obtained by curing of polyesters according to the invention with objects obtained by curing of conventional crystalline unsaturated polyesters without isocyanate modification, shows that the former have a higher impact strength at the same rigidity. Comparison of objects obtained by curing of polyesters according to the invention with objects obtained by curing of conventional crystalline unsaturated polyester, shows that the isocyanate modification gives rise to a cured compound showing a much higher flexibility.

The basic building block of the new resins is a mainly hydroxy-terminated, essentially linear, crystalline unsaturated polyester. This polyester must have a hydroxyl value (mg KOH per g polyester) between 20 and 550, preferably between 50 and 120, at an acid value of lower than 50, preferably lower than 10, in particular lower than 1. The degree of unsaturation may be between 1 and 6 moles double bonds per 1000 g polyester, and preferably between 1.5 and 3.75 moles/1000 g polyester.

The crystalline unsaturated polyester can be prepared in a known way by condensation, whether or not in the presence of a catalyst, of an unsaturated dicarboxylic acid and a diol, usually together with a saturated or aromatic dicarboxylic acid and optionally a relatively small amount of monofunctional carboxylic acid or alcohol. As unsaturated dicarboxylic acid, use is made of fumaric acid, maleic acid, or the anhydride thereof. As saturated or aromatic dicarboxylic acids, use is preferably made of compounds with a centre of symmetry, such as oxalic acid, succinic acid, adipic acid, suberic acid, terephtalic acid and/or esters/diesters thereof. As diols, use is also made of compounds with a centre of symmetry, such as ethylene glycol, 1,4-butanediol and 1,6-hexanediol or the unsaturated 2-butylenediol (1,4). Further, tricarboxylic acid or triol can be used in a deficiency to attain special effects, provided this does not, or only to a small extent, affect th crystallinity. The total amount of these modifiers remains below 10 wt.%, calculated on the sum of the components. Halogenated diols and/or halogenated (di)carboxylic acids can also be processed in the crystalline polyester. By preference, the crystalline polyester consists to at least 80 wt.% of units from the group of fumaric acid, symmetrical aliphatic $C_{2-12}$ dicarboxylic acids and symmetrical $C_{2-12}$ aliphatic diols.

Isocyanates that can be applied in the preparation may be aliphatic, cycloaliphatic or aromatic compounds. Examples are hexamethylene diisocyanate (HMDI), isophorone diisocyanate (IPDI), paraphenylene diisocyanate, 4,4'-diisocyanatodicyclohexylmethane (HDI), 4,4'-diisocyanatodiphenylmethane (MDI), toluene diisocyanates (TDI), 1,4 di-(2-isocyanatoprop-2-yl)benzene, polyarylene polyphenylisocyanate (PAPI) and oligomeric polyisocyanates such as Desmodur-N or Desmodur-L, optionally in combination with monofunctional isocyanates such as phenylisocyanate and N-butylisocyanate.

Preference is given to diisocyanates that possess a centre of symmetry, such as HMDI and MDI.

In one embodiment, the essentially hydroxy-terminated unsaturated polyester and a diisocyanate are reacted in an NCO/OH ratio between 0.25:1 and 1:1, whether or not in the presence of a catalyst that accelerates the isocyanate reaction. This yields compounds consisting of two or more polyester segments that are linked through units derived from the diisocyanate. Preferably, in this case the NCO/OH ratio is chosen between 0.4 and 0.8. The reaction is preferably carried out by adding the diisocyanate to a melt of the polyester. The reaction can also be carried out in the presence of solvent or liquid diluting agent which does not react with isocyanates and which can be removed afterwards. Optionally, the polyester may also be diluted with a relatively small amount of a diol with a molecular weight of at most 300. In that case preferably less than 5 weight % of the diol with respect to the polyester is used. The temperature will generally be chosen between 50° C. or the melting point of the polyester and 200° C.

In another embodiment, the essentially hydroxy-terminated unsaturated polyester is first reacted with an excess of diisocyanate, so that an isocyanate-terminated prepolymer is formed. The NCO/OH ratio in this case will be between 1 and 3, and preferably between 2 and 3. This prepolymer is subsequently converted with a chain-lengthening reagent, yielding a macromolecule. Eventually, an NCO/$\alpha$H ratio between 0.5 and 1 is reached, $\alpha$ representing O and/or N. This process is well-known in the polyurethane chemistry. As chain lengthener, use is made of $C_{2-12}$ aliphatic, cycloaliphatic or aromatic diols and/or diamines that preferably possess a centre of symmetry in the carbon chain. It is also possible to use alkanolamines. Examples are: ethylene glycol, 1,4-butanediol, 1,6-hexanediol, 1,4-butanediamine, phenylenediamine, ethyl-ethanolamine and phenyl-butanolamine.

In a third embodiment, an isocyanate-terminated prepolymer as described above is started from, but this prepolymer is first wholly or partly reacted with a compound that has both a group reacting with isocyanate and an outer functional group. This other group may, for instance, be an epoxy group, as in glycidol, an olefinically unsaturated group, as in hydroxyethyl(meth)acrylate, or an acid group, as in hyddroxybutyric acid. Subsequently, the remaining isocyanate groups are in the customary way reacted with a chain lengthener, as described in the second embodiment, and in doing so an NCO/$\alpha$H ratio ($\alpha$=N or O) of about 1 is reached.

All three embodiments give rise to polyester based macromolecules that are unexpectedly highly crystallinic. Furthermore, macromolecules with a molecular weight of more than 3000 or 4000 dalton are easily obtained. In contrast, this is not easily achieved by normal condensation because a conversion higher than 97% increases reaction time too much. Comparing crystalline polyesters with roughly the same molecular weight, the polyesters according the invention are unexpectedly more flexible.

The polyesters according the invention can be used favourably in thermosetting compounds. The apparent features (high flexibility or high impact strength) open new ways for crystalline polyesters, that were hereto inaccessable.

The crystalline polyesters according to the invention can be applied very well in powders, suitable in powder-in-mould coating. According to EP-A No. 106399, the relatively sharp melting points of crystalline polyesters do have a positive effect on blocking characteristics because of their dryness at low temperature, and on their fluent property at high temperature.

The powder based on polyesters according to the invention consists of one or more (co)polymerizable unsaturated components, which jointly form the bonding agent, a curing system for the bonding agent and, if so desired, other non-copolymerizable components such as release agents, flow agents, pigments, fillters, stabilizers, etc. The bonding agent comprise one or more crystalline unsaturated polyesters. The proportion of these polyesters is at least 30% (wt) and preferably at least 50% (wt) and more in particular at least 70% (wt). In addition high-boiling (co) polymerizable monomers, prepolymers or polymers may form part of the bonding agent. The monomers must have a boiling point of at least ;b 25° C. above the temperature at which the powder is applied and preferably of above 200° C. The quantity of monomers to be used is preferably less than 15% (wt), particularly less than 7% (wt), calculated in respect of the quantity of bonding agent. The purpose for which such monomers are used is in most cases to increase the degree of cross-linking. Suitable are, for instance, triallycyanurate, triallylisocyanurate, trimethylolpropanetriacrylate and triallyltrimellitate. An amorphous unsaturated polyester can also be incorporated in the bonding agent, for instance to further increase the impact resistance. Furthermore, polymers having a low molecular weight or oligomers or prepolymers can be incorporated in the bonding agent, for instance a diallylphthalate prepolymer. Generally, such additional compounds will be used only if they are required to improve the properties of the coating and in so far as they do not influence the properties of the powder adversely.

The coating powder contains a catalyst for the curing of the unsaturated compounds. Particularly peroxides are used, such as, for instance, hydroperoxides, ketoneperoxides and peresters. The quantity of catalyst mostly amounts to between 0.5 and 5% (wt) calculated in respect of the unsaturated components. In addition, a conventional accelerator may be present, for instance a cobalt compound or a solid amine. The various component parts of the powder can be ground, separately or mixed together in two or more premixes, to the required particle size and the powders can then be mixed, or all components can also be mixed together at a temperature at which all organic compounds are liquid as disclosed in, for instance U.S. Pat. No. 4,287,310 and 4,228,113. When mixing at elevated temperature in the presence of a peroxide, there may already be a certain degree of polymerization. Such coating powders the components of which have already been subject to a slight copolymerization also come within the scope of the invention. The grain size of the powder is generally between 0.01 and 0.02 mm and preferably between 0.03 and 0.08 mm.

The powder is applied to the wall or walls of a mould, which have a temperature of between 75° C. and 200° C. and preferably between 100° C. and 160° C. The powder melts and forms a continuous layer. The polymer is allowed to cure to such an extent that the layer can withstand some mechanical load but is not yet cured completely and thoroughly, in such a manner that good adhesion with the polyester moulding compound is obtained. The powder is applied preferably by electrostatic spraying. The coating eventually obtained in generally between 0.05 and 0.8 mm thick. In the half-mound process the object is obtained by subsequently building up the walls of the object on the coating by applying, in a plurality of cycles, unsaturated polyester and glassfibre, whether mixed or not, and allowing them to cure. The wall of the mould provided with the coating may form part also of a mould in which objects are made from polyesters at elevated temperature and pressure via the SMC or BMC moulding techniques or by injection moulding.

The invention will be elucidated with reference to the following examples, without being restricted to the embodiment described therein.

EXAMPLE I

A. An unsaturated crystalline polyester was prepared in a way which further is known by condensation of 1162 parts by weight adipic acid, 1330 parts fumaric acid and 2007 parts 1,4-butanediol. The components were mixed and heated to 210° C., oxygen being excluded. Subsequently, 0.65 part tinoctoate was added and condensation was continued with a small amount of toluene as entraining agent for discharge of the reaction water. The reaction was stopped and the toluene removed when an acid value lower than 1 (mg. KOH/g polymer) was reached. In this way, a crystalline resin was obtained which had an acid value of lower than 1, a hydroxyl value of 56, a degree of unsaturated of 3.0 moles/1000 g polymer and a melting point of 89° C. (measured via DTA).

B.1. The resin obtained under A was modified with an isocyanate. To this end, 1500 parts of the dry resin were melted in a reactor provided with an anchor agitator. As soon as the temperature of the mass reached a value of 95° C., 88 parts diphenylmethane-4,4'-diisocyanate (MDI-isocyanate 125M of Upjohn) were added (the NCO/OH ratio was 0.47) while stirring was applied and moisture and temperature were excluded, resulting in a brief temperature increase to 115° C. The mixture was subsequently kept at 100° C. for 45 minutes, until isocyanate groups could no longer be demonstrated. After this, 0.16 part hydroquinone was mixed in, following which the resin was drained off, cooled and processed to flakes. The resulting resin has a melting point (DTA) of 88° C.

B.2. A somewhat deviating modification was carried out by melting 1000 parts of resin A and mixing at 95° C., first with 44.9 parts 1,4-butanediol and subsequently with 183.5 parts MDI (the NCO/OH ratio in this case was 0.735), a peak temperature of 145° C. being recorded. The mixture was heated at 140° C. for 45 minutes, after which isocyanate groups could no longer be demonstrated. After mixing in of 0.13 part hydroquinone, the resin was drained off, cooled and powdered. The resulting resin has a melting point (DTA) of 81° C.

EXAMPLE II

C. An unsaturated crystalline polyester was prepared in a way which further is known by inter-esterification of 870.3 parts by weight dibutylfumarate with 525.7 parts by weight 1,6-hexanediol, 0.3 part by weight tinoctoate being added. The reaction was stopped after no more distillate had been collected during two hours at 200° C. The total amount of distillate was 529 parts by weight (theoretically 565). After cooling to 150° C., 0.125 part by weight toluhydroquinone was added, after which the resin was poured out at 120° C. and became crystalline. The hydroxyl value was 79, the acid value 0.9. DTA analysis yielded two peaks, at 69° and at 82° C.

D. 500 peaks by weight of the resin obtained under C were melted at 90° C. in a reactor with an anchor agitator. After inert gas had been passed over for 10 minutes, 220.0 parts by weight MDI (NCO/OH=2.50) were added. Because of the exothermic reaction, the temperature increased to 105° C. Without further heating, the mixture reacted for 40 minutes. With rapid stirring subsequently 68.6 parts by weight 1,4-butanediol were added (NCO/OH =0.79). The temperature increased to 142° C. The reaction temperature was brought at 140° C. and after 45 minutes' recting, isocyanate was no longer demonstrated. The resin was subsequently drained off, cooled and powdered. The DTA measurement yielded peaks at 66° and 79° C.

COMPARISON EXPERIMENT 1

An unsaturated crystalline polyester was prepared in a way which further is known by condensation of 2672 parts by weight 1,6-hexanediol, 692 parts by weight terephthalic acid and 0.45 parts by weight difenylolpropane. The components were mixed and heated at 230° C., oxygen being excluded. The reaction was continued until an acid number of 7.5 was reached. The mixture was cooled down to 170° C. and 1864 parts by weight fumaric acid was added. After heating to 210° C., the reaction was continued. After an acid value of 9.3 was reached, 0.45 part by weight toluhydroquinone was added, and the mixture was cooled. The resulting resin had an unsaturation number of 3.6 mole/1000 g polymer, a melting point of 99° C. (Ring and Ball), an acid value of 8 and an hydrogen value of 52.

EXAMPLE III

E. Applying the same method, as in comparison experiment A, a crystalline polyester was obtained from 2821 parts by weight 1,6-hexanediol, 502 parts by weight terephthalic acid, 0.45 difenol propane and 1864 parts by weight fumaric acid. The resulting polyester had an unsaturation number of 3.6 mole/1000 g polymer, a melting point of 95° C. (Ring and Ball), an acid value of 7 and an hydroxyl value of 103.

F. 4000 parts by weight of the resin, obtained under E. were melted at 90° C. in a reactor with an anchoir agitator. After inert gas had been passed over for 10 minutes 472 parts by weight MDI were added, and the temperature of the mixture increased to 122° C., due to the exothermic reaction. The reaction mixture was brought at 95° C. and the rection was performed for another two hours, till isocyanate was no longer demonstrated. The resin was subsequently drained off, cooled and powdered. The NCO/OH ratio was 0,44. The so obtained resin had a melting point of 91° C. and an hydroxyl value of 57.

COMPARISON EXPERIMENT 2, AND EXAMPLE IV

From the resin obtained accordingg to comparison experiment 1 and example III (F) powders were prepared, suitable as a pure press-compound and further for powder-in-mould-coating.

According to table 1, two mixtures were prepared by melting the components at 80° C. T-butylperbenzoate was added just before cooling. The mixture were grinded after cooling to 100 μm.

TABLE 1

| components | exp. 2* | examp. IV* |
|---|---|---|
| unsaturated, crystalline polyester resin from exp. 1 | 100 | — |
| unsaturated, crystalline polyester resin from examp. III-F | — | 100 |
| acrylate flowing agent | 1 | 1 |
| Titane-white | 10 | 10 |
| triallylisocyanurate | 3 | 3 |
| p-benzoquinone | 50 ppm | 50 ppm |
| t-butylperbenzoate | 2 | 2 |

*parts by weight

The so-prepared compounds 2 and IV were cured in a mould at 120° C. for 20 minutes. Mechanical properties are shown in table 2.

TABLE 2

| property | compound | |
|---|---|---|
|  | 2* | IV |
| tensile strength (N/mm$^2$) | 40,5 ± 7 | 10,2 ± 2 |
| E-modulus (N/mm$^2$) | 2525 ± 300 | 300 ± 80 |
| strain (%) | 2,8 ± 0,4 | 21,3 ± 2,5 |

Furthermore, the prepared compound IV was used for powder-in-mould coating. A smooth and glossy surface was achieved while applying compound IV as powder for a surface layer using sheet moulding and bulk moulding compound techniques.

We claim:

1. The crystalline unsaturated polyester urethane consisting of polyester segments derived from crystalline and essentially linear hydroxy terminated polyesters bound through urethane bonds to units derived from a (poly)isocyanate, said linear hydroxy-terminated polyesters having an acid value of at most 10 and a hydroxyl value of between 20 and 550 mg KOH/g polyester and having a degree of unsaturation between 1 and 6 moles of double bonds per 1000 grams of polyester, wherein said polyester segments are derived to at least 80 wt. % from units selected from the group consisting of fumaric acid, symmetrical aliphatic $C_2$ to $C_{12}$ dicarboxylic acids and symmetrical $C_2$ to $C_{12}$ diols, wherein said crysalline polyester urethane has a sharp melting point.

2. A chain lengthened crystalline unsaturated polyester urethane obtained by reacting the crystalline unsaturated polyester urethane of claim 1 with a chain lengthener wherein the hydroxy-terminated polyester and the diisocyanate are in a ratio corresponding with a ratio of NCO/OH between 1:1 and 3:1.

3. The crystalline unsaturated polyester urethane according to claim 1 wherein said linear hydroxy-terminated polyesters have a degree of unsaturation between 1.5 and 3.75 moles/1000 g polyester.

4. A crystalline unsaturated polyester urethane according to claim 1 having a melting point of at least 40° C.

5. The crystalline unsaturated polyester urethane according to claim 1, wherein said polyester segments are derived from hydroxy-terminated polyesters having an acid value of at most 10 and a hydroxyl value of between 20 and 550 (both values in mg KOH/g polyester) and a degree of unsaturation between 1 and 5 moles of double bonds per 1000 g polyester.

6. The crystalline unsaturated polyester urethane according to claim 1, wherein said (poly)isocyanate is a diisocyanate selected from the group consisting of hexamethylene diisocyanate, para-phenylene diisocyanate, and 4,4'-diisocyanatodi-phenylmethane.

7. The crystalline unsaturated polyester urethane according to claim 1, said crystalline unsaturated polyester urethane having linkages from a hydroxy-terinated polyester and a diisocyanate wherein said hydroxy-terminated polyester and said diiscoyanate are in a ratio corresponding with a ratio of NCO/OH between 0.25:1 and 1:1.

8. The crystalline unsaturated polyester urethane according to claim 7, wherein said ratio is between 0.4:1 and 0.8:1.

9. Polyester according to claim 1, wherein said melting point is at least 70° C.

10. The crystalline unsaturated polyester urethane according to claim 1, wherein said polyester segments are derived from hydroxy-terminated polyesters having an acid value of at most 10 and a hydroxyl value of between 50 and 120.

11. The crystalline unsaturated polyester urethane consisting of:

segments derived from crystalline and essentially linear hydroxy-terminated polyesters bonded via urethane linkages to the organic residue of a diisocyanate, said polyesters having an acid value of at least 10 and a hydroxyl value of between 20 and 550 mg KOH/g polyester and having a degree of unsaturation between 1 and 6 moles of double bonds per 100 grams of polyester, wherein said polyester segments are derived to at least 80 wt % from units selected from the group consisting of fumaric acid, symmetrical aliphatic $C_2$ to $C_{12}$ dicarboxylic acids and symmetrical $C_2$ to $C_{12}$ diols, wherein said diisocyanate is selected from the group consisting of hexamethylene diiscoyanate, para-phenylene diisocyanate, 4,4'-diisocyanato-diphenylmethane, isophorone diisocyanate, 4,4'-diisocyanato-di-cyclohexylmethane, and toluene diisocyanates, and wherein said crystalline polyester urethane has a sharp melting point.

12. A powdered-in-mold coating composition comprising:

an unsaturated polyester urethane resin as an essential binding agent; and a curing catalyst wherein the binding agent comprises a crystalline unsaturated polyester bound through urethane bonds to repeating units derived from a polyisocyanate, said crystalline unsaturated polyester having a sharp melting point.

13. A molded object having an inner boding comprising a cured thermosetting resins coated with a coating which consists essentially of a cured crystalline unsaturated polyester urethane consisting of repeating segments derived from an essentially hydroxy-terminated unsaturated polyester bound through urethane bonds to repeating units derived from a polyisocyanate, said crystalline unsaturated polyester urethane having a sharp melting point.

14. A powdered-in-mold coating composition comprising an unsaturated polyester urethane resin as a binding agent, said binding agent comprising a crystalline unsaturated polyester urethane consisting of polyester segments derived from a crystalline and essentially linear hydroxy-terminated polyester bound through urethane bonds to units derived from a polyisocyanate, said linear hydroxy-terminated polyester having an acid value of at most 10 and a hydroxyl value of between 20 and 550 KOH/g polyester and having a degree of unsaturation between 1 and 6 moles of double bonds per 1000 grams of polyester, wherein said polyester segments are derived to at least 80 wt. % from units selected from the group consisting of fumaric acid, symmetrical aliphatic $C_2$ to $C_{12}$ dicarboxylic acids and symmetrical $C_2$ to $C_{12}$ diols, wherein said crystalline polyester has a sharp melting point; and a curing catalyst.

* * * * *

UNITED STATES PATENT AND TRADEMARK OFFICE
CERTIFICATE OF CORRECTION

PATENT NO. : 4,839,438

DATED : June 13, 1989

INVENTOR(S) : Johannes T.M. Evers et al

It is certified that error appears in the above-identified patent and that said Letters Patent is hereby corrected as shown below:

Column 4, line 8, "fillters" should read --fillers--;

line 65, "in" should read --is--

Column 6, line 14, "recting" should read --reacting--;

61, "accordingg" should read --according--.

Signed and Sealed this

Nineteenth Day of June, 1990

Attest:

HARRY F. MANBECK, JR.

*Attesting Officer*   *Commissioner of Patents and Trademarks*